United States Patent [19]

Tsubouchi et al.

[11] Patent Number: 4,805,480

[45] Date of Patent: Feb. 21, 1989

[54] HAND BRAKE LEVER ASSEMBLY FOR PARKING BRAKE

[75] Inventors: Kaoru Tsubouchi, Toyota; Takeo Yamazaki, Anjo; Tomio Tachino, Chiryu; Takuya Inaba; Yoshihiro Nakagiri, both of Toyota; Hiroshi Uemura, Okazaki; Juichi Shibatani, Toyota, all of Japan

[73] Assignees: Aisin Seiki Kabushiki Kaisha, Kariya; Toyota Jidosha Kabushiki Kaisha, Toyota, both of Japan

[21] Appl. No.: 80,306

[22] Filed: Jul. 31, 1987

[30] Foreign Application Priority Data

Jul. 31, 1986 [JP] Japan .................. 61-117888
Jul. 31, 1986 [JP] Japan .................. 61-117890
Aug. 22, 1986 [JP] Japan .................. 61-128514

[51] Int. Cl.⁴ .................................. G05G 1/00
[52] U.S. Cl. .................... 74/503; 74/548; 74/529; 74/540; 192/67 R
[58] Field of Search ............ 74/503, 548, 529, 540, 74/543, 501 R, 501 A, 502, 523; 192/67 R, 95; 403/1, 336

[56] References Cited

U.S. PATENT DOCUMENTS

| | | |
|---|---|---|
| 2,567,571 | 9/1951 | Merriman ............... 74/503 |
| 3,604,286 | 9/1971 | Foreman ............... 74/523 |
| 3,075,402 | 1/1963 | Sellars ............... 74/503 |
| 3,168,933 | 2/1965 | Thorner ............... 74/503 |
| 3,191,979 | 6/1965 | Trudeau ............... 74/503 |
| 3,243,837 | 4/1966 | Smith ............... 74/503 |
| 3,473,403 | 10/1969 | Biro ............... 74/503 |
| 3,577,798 | 5/1971 | Guettier ............... 74/503 |
| 4,240,307 | 12/1980 | Yamazaki et al. ............... 74/503 |

FOREIGN PATENT DOCUMENTS

| | | | |
|---|---|---|---|
| 1074412 | 1/1960 | Fed. Rep. of Germany | 74/503 |
| 0057726 | 5/1979 | Japan | 74/529 |
| 60-134065 | 6/1985 | Japan | 74/503 |

Primary Examiner—Richard E. Moore
Assistant Examiner—Vinh Luong
Attorney, Agent, or Firm—Oblon, Fisher, Spivak, McClelland & Maier

[57] ABSTRACT

A hand brake lever assembly includes a plunger mounted on a support for axial slidable movement and for rotation about its axis and being connected at its one end to a parking brake, a locking mechanism associated with the plunger to retain the plunger in a pulled out position against a returning effort of the parking brake acting thereon and being arranged to be released by rotation of the plunger, a sleeve member secured to the other end of the plunger and having an annular end wall formed with a first annular cam surface and an axial key groove, a handle having a shaft extending therefrom and inserted into the sleeve member, the handle shaft being formed with an axial guide groove and being integrally provided with a cam member which is formed with a second annular cam surface complementary with the first cam surface and is axially slidably coupled within the sleeve member, a first spring for pressing the annular cam surfaces in contact with each other, a release rod axially slidably coupled with the guide groove for rotation with the handle, the release rod being formed at its one end with a key to be brought into engagement with the axial key groove and being provided at its other end with a knob, and a second spring for biasing the knob toward the plunger to disengage the key of the release rod from the axial key groove of the sleeve member.

11 Claims, 8 Drawing Sheets

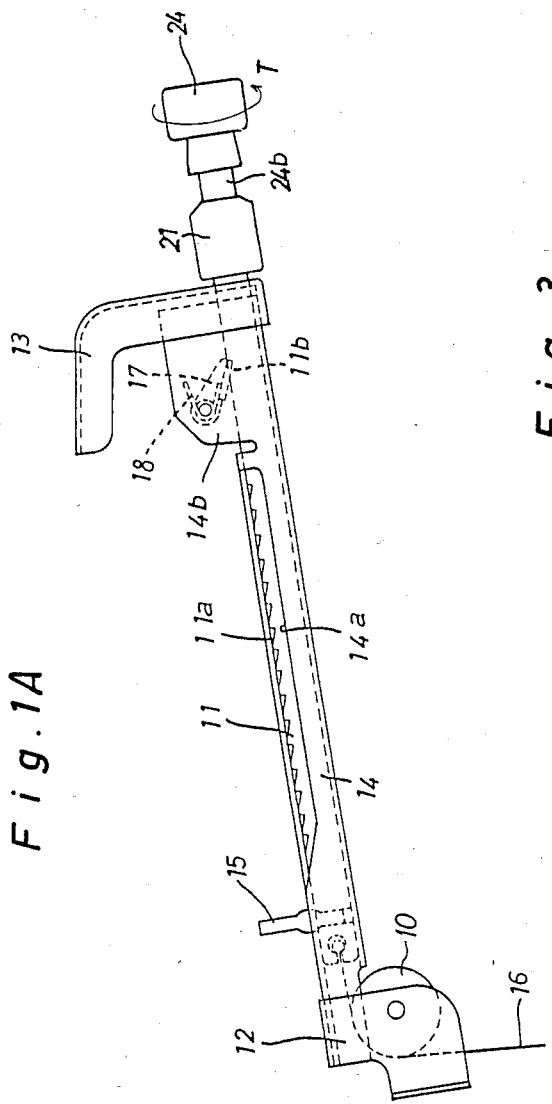
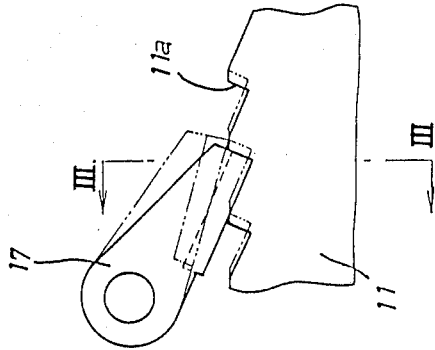

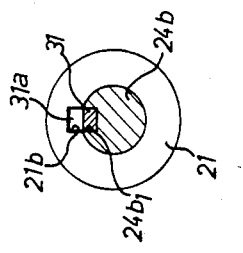
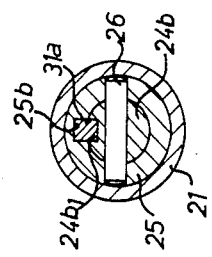
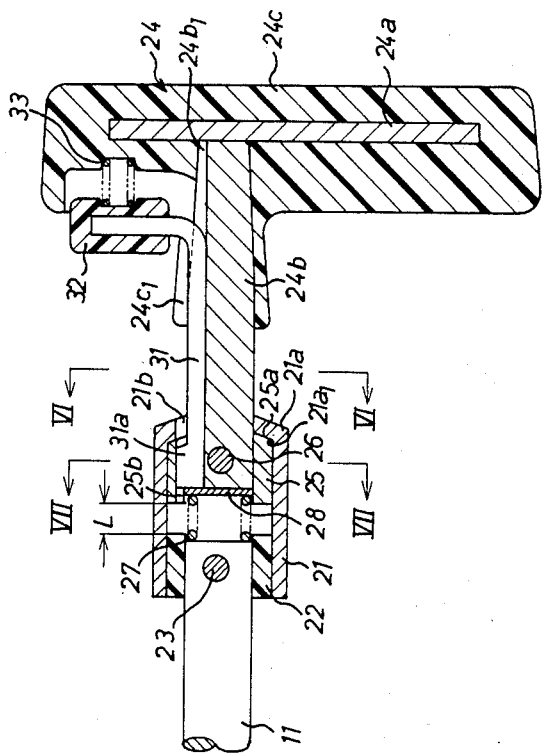
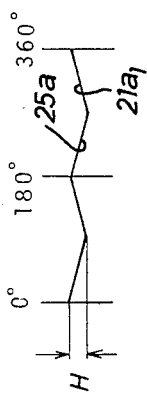

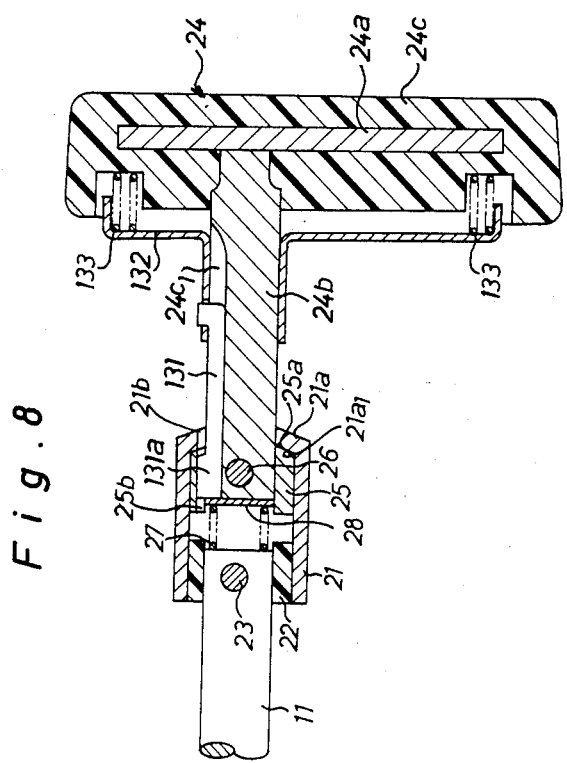
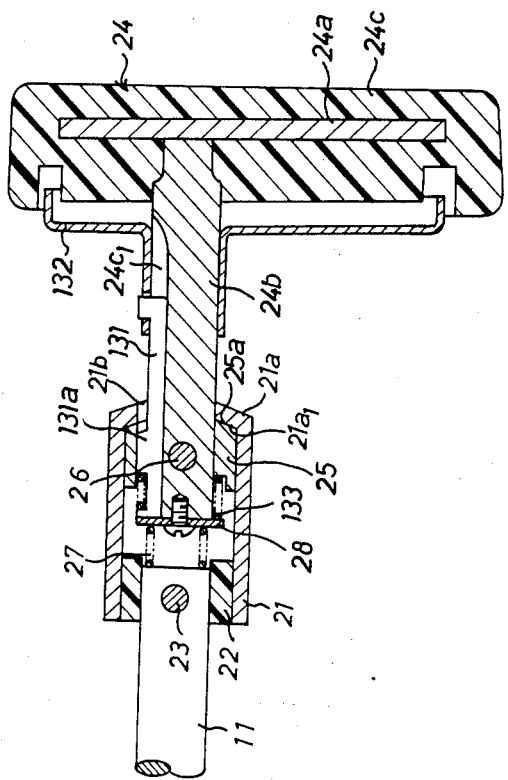
Fig. 8
Fig. 9

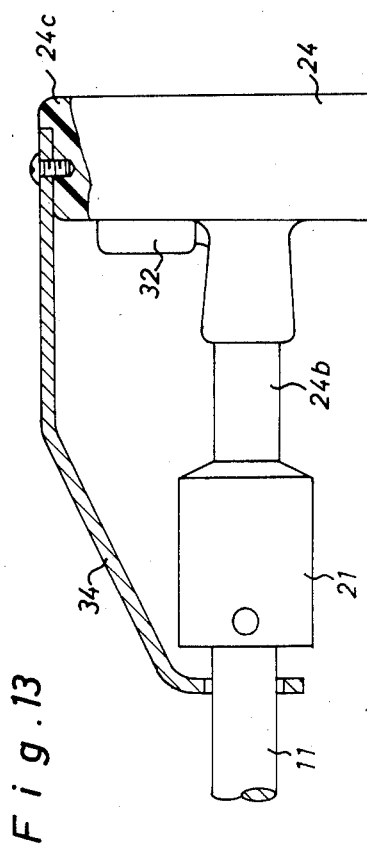
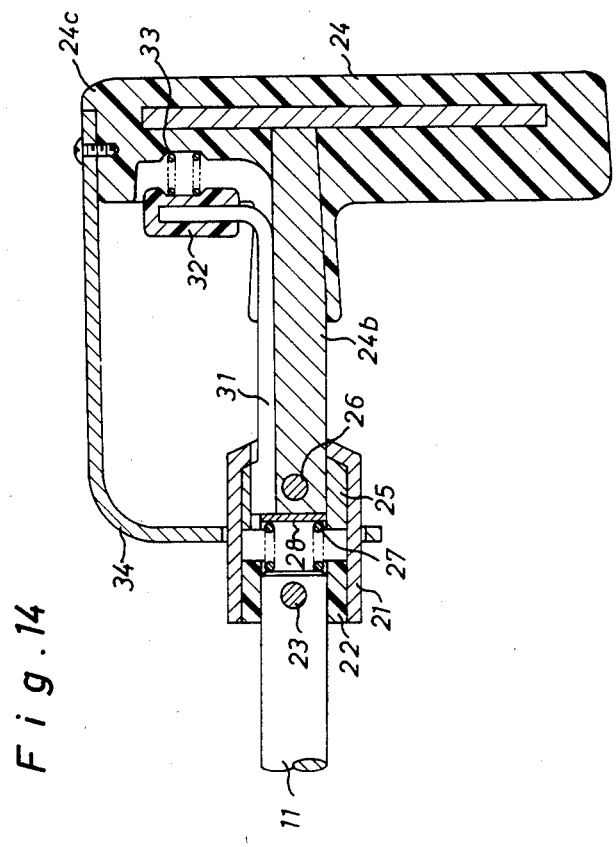
Fig. 13
Fig. 14

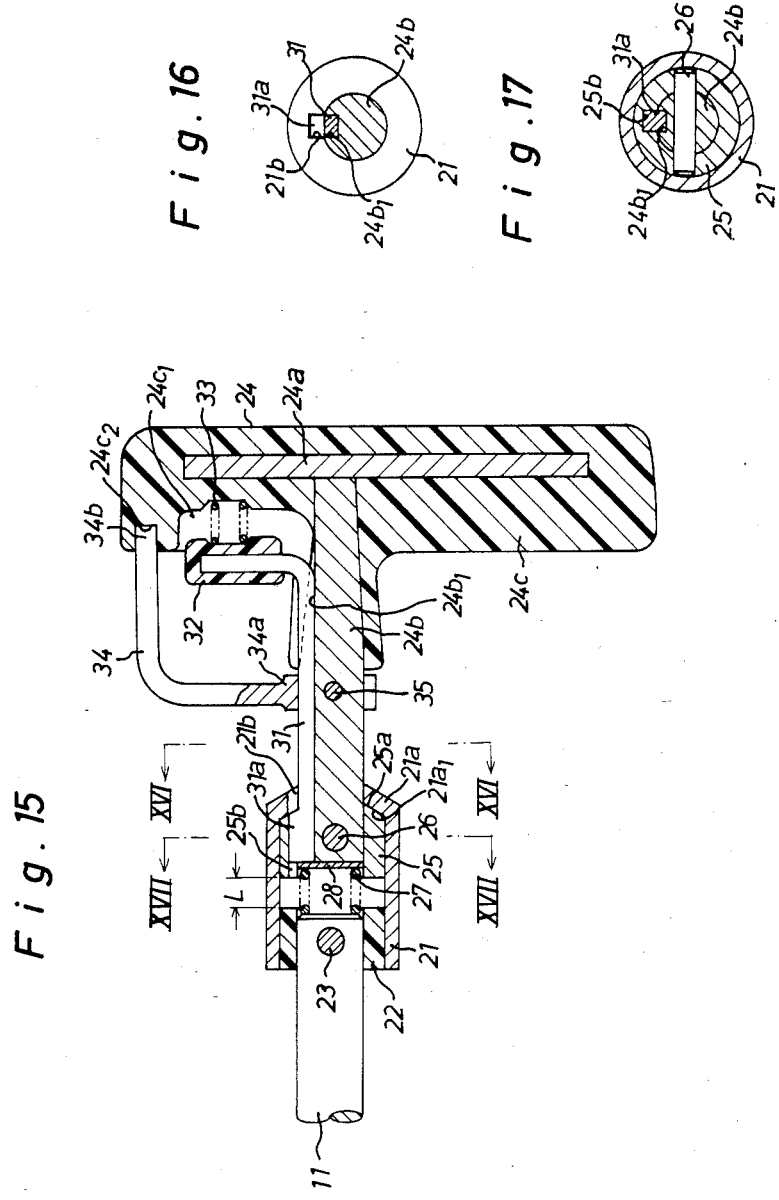

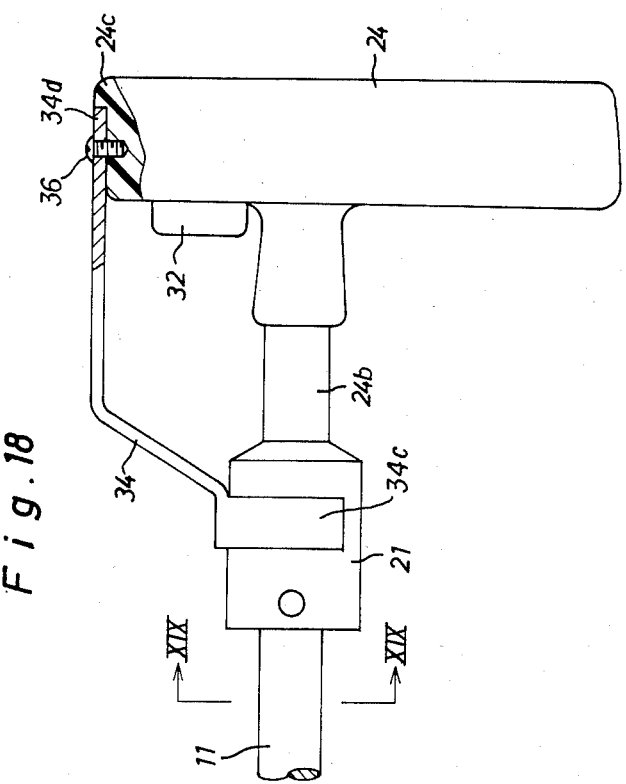

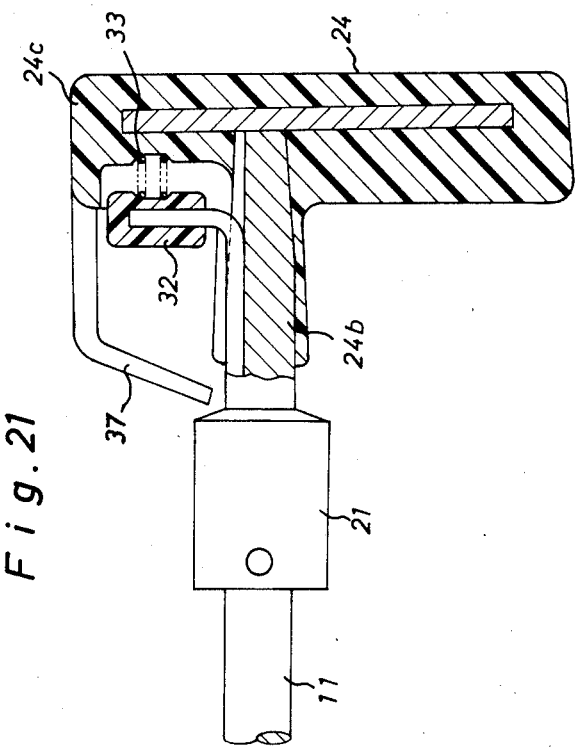
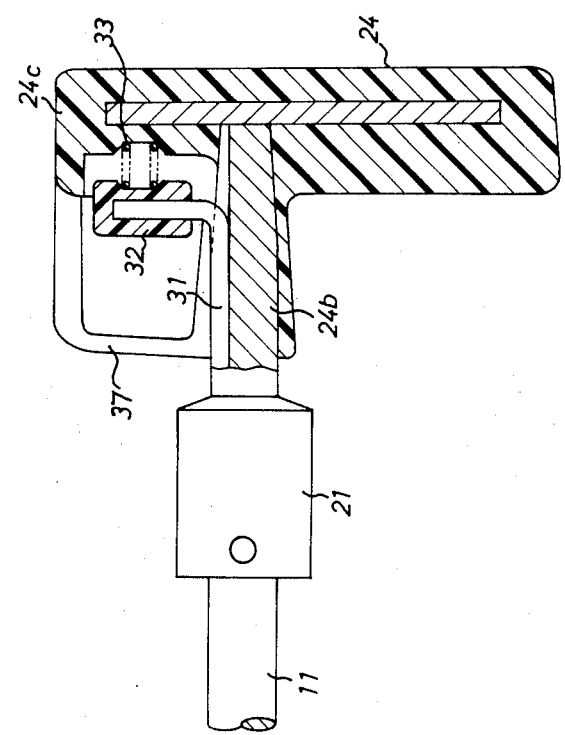

HAND BRAKE LEVER ASSEMBLY FOR PARKING BRAKE

BACKGROUND OF THE INVENTION

1. Field of the Invention

The present invention relates to a hand brake lever assembly for actuating a parking brake in automotive vehicles. The invention is particularly concerned with a safety mechanism of a hand brake lever assembly of the stick type which includes a rod-like plunger mounted on a vehicle body structure for axial slidable movement and for rotation about its axis. The rod-like plunger is connected at one end thereof to a cable or other linkage leading to a parking brake, and a handle is attached to the other end of the plunger. A locking mechanism is associated with the plunger to retain the plunger in a pulled-out position against a returning effort of the parking brake acting thereon when it has been pulled by the driver in the act of pulling the handle. The locking mechanism arranged to be released by rotation of the plunger.

2. Discussion of the Background

In Japanese utility model early publication No. 60-134065, there has been proposed a hand brake lever assembly of this kind which includes a rod-like plunger mounted on a vehicle body structure for axial slidable movement and for rotation about its axis. The rod-like plunger is connected at one end thereof to a cable or other linkage leading to a parking brake, and a sleeve member is coaxially secured to the other end of the plunger for rotation therewith. A handle having a shaft extending therefrom is inserted into the sleeve member for axial movement and rotation about its axis. The sleeve member has an annular end wall formed with an annular cam surface facing in the direction opposite to the handle pulling force acting on the plunger. The handle shaft has an enlarged portion formed with an annular cam surface complementary with the annular cam surface of the sleeve member and contained within the sleeve member of axial movement and rotation about its axis. The annular cam surfaces are pressed in contact with each other under load of a compression spring in the sleeve member to retain the handle in a predetermined angular position in relation to the plunger.

The brake lever assembly enables a rotatable connection of the handle with the plunger for unitary rotation only when the handle is pulled such that actuation of the parking brake is maintained even when the handle is turned by being inadvertently touched by the driver's hands or legs while the parking brake is being actuated. In the brake lever assembly, the unitary rotation of the plunger with the handle is effected by frictional engagement force between the cam surfaces to release the locking mechanism. For this reason, if the frictional engagement force between the cam surfaces is insufficient due to weak pulling force of the handle, the unitary rotation of the plunger with the handle will not be effected to disable release of the locking mechanism.

OBJECT OF THE INVENTION

It is, therefore, a primary object of the present invention to provide an improved safety mechanism for the hand brake lever assembly in which a spring loaded release knob is assembled with the handle to reliably effect the unitary rotation of the plunger with the handle when the knob is pulled in rotation of the handle.

SUMMARY OF THE INVENTION

According to the present invention, there is provided a hand brake lever assembly for a parking brake which comprises a longitudinal plunger mounted on a vehicle body structure for axial slidable movement and for rotation about its axis. The longitudinal plunger has a first end connected to a cable or other linkage leading to the parking brake and a second end. A locking mechanism is associated with the plunger to retain the plunger in a pulled out position against a returning effort of the parking brake action thereon. The locking mechanism is arranged to be released by rotation of the plunger. A sleeve member is coaxially secured to the second end of the plunger for rotation therewith, the sleeve member having an annular end wall formed with an annular cam surface and an axial key groove. A handle having a shaft extending therefrom is inserted into the sleeve member for axial movement and rotation about its axis. The handle shaft has formed thereon an axial guide groove, and it is integrally provided with a cam member which is formed with an annular cam surface complementary with the annular cam surface of the sleeve member. The handle shaft is contained within the sleeve member for axial movement and rotation about its axis. A first spring is provided for pressing the annular cam surface of the cam member into contact with the annular cam surface of the sleeve member to retain the handle in a predetermined angular position in relation to the plunger. A release rod is axially slidably coupled with the axial guide groove of the handle shaft for rotation with the handle, the release rod being integrally formed at one end thereof with a key which is axially slidably coupled with an axial groove in the cam member to be brought into engagement with the axial key groove of the sleeve member. The release rod is further provided at the other end thereof with a knob which is arranged adjacent a grip portion of the handle. A second spring is provided for biasing the knob of the release rod toward the plunger to disengage the key of the release rod from the axial key groove of the sleeve member.

In another aspect of the invention, there is provided a hand brake lever assembly for a parking brake which comprises a longitudinal plunger mounted on a vehicle body structure for axial slidable movement and for rotation about its axis. The longitudinal plunger has a first end connected to a cable or other linkage leading to the parking brake and a second end. A locking mechanism is associated with the plunger to retain the plunger in a pulled out position against a returning effort of the parking brake acting thereon. The locking mechanism is arranged to be released by rotation of the plunger. A sleeve member is coaxially coupled with the second end of the plunger through a first cam member in the form of a collar and secured in place for rotation with the plunger. The sleeve member has an annular end wall formed with an axial key groove. The first cam member is formed with an annular cam surface. A handle having a shaft extending therefrom is inserted into the sleeve member for axial movement and rotation about its axis. The handle shaft has formed thereon an axial guide groove, and it is integrally provided with a second cam member which is formed with an annular cam surface complementary with the annular cam surface of the first cam member. The handle shaft is contained within the sleeve member for axial movement and rotation about its axis. A first spring is provided for pressing the annular cam surface of the second cam member into contact with the annular cam surface of the first cam member to retain the handle in a predetermined angular position in relation to the plunger. A release rod is axially slidably coupled with the axial guide groove of the handle shaft for rotation with the handle, the release rod being integrally formed at one end thereof with a key which is axially slidably coupled with an axial recess in the second cam member to be brought into engagement with the axial key groove of the sleeve member. The release rod is further provided at the other end thereof with a knob which is arranged adjacent a grip portion of the handle. A second spring is provided for biasing the knob of the release rod toward the plunger to disengage the key of the release rod from the axial key groove of the sleeve member.

BRIEF DESCRIPTION OF THE DRAWINGS

Additional objects, features and advantages of the present invention will be readily appreciated from the following detailed description of preferred embodiments thereof when considered with reference to the accompanying drawings, in which:

FIG. 1A is a side view of a hand brake lever assembly in accordance with the present invention in its rest condition;

FIG. 1B is a side view of the hand brake lever assembly shown in FIG. 1A in its pulled-out condition.

FIG. 2 is an enlarged side view of a locking mechanism for the hand brake lever assembly shown in FIG. 1;

FIG. 3 is a fragmentary sectional view taken substantially along the plane of line III—III in FIG. 2;

FIG. 4 is an enlarged sectional view of a handle and its associated parts in the hand brake lever assembly shown in FIG. 1;

FIG. 5 is a developed view illustrating in detail cam surfaces shown in FIG. 4;

FIG. 6 is a cross-sectional view taken along the plane of line VI—VI in FIG. 4;

FIG. 7 is a cross-sectional view taken along the plane of line VII—VII in FIG. 4;

FIGS. 8 and 9 each illustrate a modification of the hand brake lever assembly shown in FIGS. 1 to 4;

FIG. 13 illustrates a further modification of the hand brake lever assembly shown in FIGS. 1 to 4;

FIG. 14 illustrates a still further modification of the hand brake lever assembly shown in FIGS. 1 to 4;

FIG. 15 illustrates a further modification of the hand brake lever assembly shown in FIGS. 1 to 4;

FIG. 16 is a cross-sectional view taken along the plane of line XVI—XVI in FIG. 15;

FIG. 17 is a cross-sectional view taken along the plane of line XVII—XVII in FIG. 15;

FIG. 18 is a partly broken side view of a modification of the hand brake lever assembly shown in FIGS. 1 to 4;

FIG. 19 is a cross-sectional view taken along the plane of line XIX—XIX in FIG. 18; and FIGS. 20 and 21 each illustrate a modification of the hand brake lever assembly shown in FIGS. 1 to 4;

DESCRIPTION OF THE PREFERRED EMBODIMENTS

Figure 12:
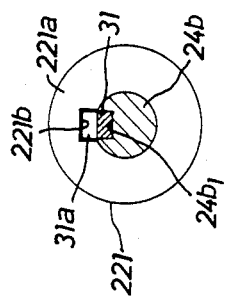
FIG. 12 is a cross-sectional view taken along the plane of line XII—XII in FIG. 10.

Referring now to the drawings, particularly to FIG. 1, there is illustrated a hand brake lever assembly of the stick type for actuating a parking brake (not shown) in an automotive vehicle. The hand brake lever assembly includes a rod-like plunger 11 supported by a tubular support member 14 for axial slidable movement and for rotation about its axis. The support member 14 is provided at a forward end thereof with a lower bracket 12 for attachment to a fixed part of the vehicle such as the dash panel and at a rearward end thereof with an upper bracket 13 for attachment to a stationary structure in the vehicle compartment. As shown in FIGS. 1 to 3, the plunger 11 has ratchet teeth 11a formed thereon in longitudinal series. Additionally, ratchet tooth 11b axially spaced from the ratchet teeth 11a is formed thereon. The plunger 11 has a pin 15 radially projecting therefrom. Limit upon rotary movement of the plunger 11 is controlled by the pin 15, which extends upwardly through a longitudinal slot 14a in the tubular support member 14.

When the plunger 11 is in a released position as shown in FIG. 1, the pin 15 engages one longitudinal edge defining the slot 14a to restrict rotary movement of the plunger 11. When the plunger 11 is pulled rearwardly, the pin 15 becomes rotatable to permit rotary movement of the plunger 11 and engages the opposite longitudinal edge defining the slot 14a to limit rotary movement of the plunger 11 to a predetermined circumferential extent, thereby to preventing full turning of the plunger 11. The forward end of the plunger 11 is connected to a cable 16 which is guided by a pulley 10 pivoted to the lower bracket 12 and connected to the parking brake. The plunger 11 is biased forwardly by a return spring of the parking brake and retained in the released position by means of a pawl 17 which is engaged with the ratchet tooth 11b of plunger 11 under load of a torque spring 18 assembled thereto. As shown in FIGS. 1 to 3, the pawl 17 has a U-letter shaped cross-section and is pivoted to upstanding flange portions 14b formed on the rearward end of the tubular support member 14.

When the plunger 11 is pulled rearwardly to actuate the parking brake through the cable 16, it is applied with a returning effort of the actuated parking brake. During rearward movement of the plunger 11, as shown in FIG. 2, the pawl 17 is swung by abutment against the ratchet teeth 11a of the plunger 11 and is engaged with any one of the ratchet teeth 11a of the plunger 11 under the load of the torque spring 18 to retain the plunger 11 in a pulled out position against the returning effort acting thereon. The engagement of the pawl 17 with the ratchet teeth 11a is released by rotation of the plunger 11 about its axis as shown by an arrow T in FIG. 1. From the above description, it will be understood that the pawl 17 cooperates with the ratchet teeth 11a of the plunger 11 to provide a ratchet type locking mechanism for the plunger 11.

As shown in FIG. 4, a sleeve member 21 is coaxially coupled with the rearward end of the plunger 11 through a collar 22 of synthetic resin. The collar 22 is secured to the plunger 11 by means of a radial pin 23 for rotation therewith. The sleeve member 21 has a cam portion 21a in the form of an annular end wall which is formed with an annular cam surface $21a_1$ and an axial key groove 21b. The annular cam surface $21a_1$ has a W-like configuration in developed view as shown in FIG. 5. A handle 24 is attached to the sleeve member 21 in such a manner as to be axial movable and rotatable about the axis of the plunger 11. The handle 24 is connected to a sleeve-like cam member 25 which is axially slidably and rotatably coupled within the sleeve member 21. An axial space L between the collar 22 and the cam member 25 is determined to be larger than the lift amount H of the cam surface $21a_1$.

The handle 24 is composed of a grip portion 24c made of synthetic resin. A metallic core plate 24a is embedded in the grip portion 24c and a metallic handle shaft 24b is welded to the metallic core plate 24a. The cam members 25 is integrally connected to a forward end of the metallic handle shaft 24b by means of a radial pin 26 for rotation therewith. The cam member 25 is formed at its rear end with an annular cam surface 25a complementary with the cam surface $21a_1$ of the sleeve member 21. The cam surfaces $21a_1$ and 25a are pressed in contact with each other under load of a compression coil spring 27 which is engaged at ore end thereof with the rearward end of the plunger 11 and at another end thereof with the forward end of the metallic handle shaft 24b through a circular retainer plate 28 to bias the handle 24 rearwardly.

As shown in FIGS. 4, 6 and 7, the grip portion 24c of the handle 24 is formed with a forwardly opening recess $24c_1$, and the metallic handle shaft 24b is formed at an upper portion thereof with an axial guide groove $24b_1$ in which a release rod 31 is slidably disposed for rotation with the metallic handle shaft 24b. The release rod 31 is integrally formed at its forward end with a key 31a and is integrally provided at its rearward end with a knob 32 made of synthetic resin. The key 31a of the release rod 31 is axially slidably coupled within an axial groove 25b in the cam member 25 to be brought into engagement with the axial key groove 21b of the sleeve member 21 when the release rod 31 is pulled rearwardly. The key 31a of the release rod 31 is resiliently engaged with the retainer plate 28 under load of a compression coil spring 33 disposed between the knob 32 and the grip portion 24c of the handle 24. The biasing force of the compression coil spring 33 is determined to be smaller than that of the compression coil spring 27.

In operation, the handle 24 is pulled rearwardly to actuate the parking brake. In this operation, the force on the handle 24 is applied to the plunger 11 through the metallic handle shaft 24b, the radial pin 26, the cam member 25, the sleeve member 21, and the radial pin 23 to cause rearward movement of the plunger 11. Thus, the cable 16 is pulled by the plunger 11 to actuate the parking brake, and the pawl 17 is engaged with any one of the ratchet teeth 11a of the plunger 11 to retain the plunger 11 in the pulled out position. In a condition where the plunger 11 has been pulled rearwardly by means of the handle 24 and retained in the pulled out position, the plunger 11 does not rotate even when the handle 24 is turned by being inadvertently touched by a part of the driver's body such as his knee. In this instance, the torque of the handle 24 is applied to the plunger 11 due to the frictional engagement between the cam surfaces $21a_1$ and 25a under the load of the compression coil spring 27. The torque handle 24 is, however, smaller than the torque required to disengaging the pawl 17 from the ratchet teeth 11a of the plunger 11. For this reason, the metallic handle shaft 24b and the parts assembled thereto are freely rotated without causing any rotation of the plunger 11. This is effective to maintain the plunger 11 in the pulled out position so as to afford a safety factor against accidental release of the parking brake. In addition, the torque of the handle 24 will be eliminated by the frictional engagement between the cam surfaces $21a_1$ and 25a. The above operation has nothing to do with the number of turning of the handle 24, but returns the handle 24 to the position illustrated in FIG. 4 or the position where the handle 24 is turned 180 degrees from the position of FIG. 4 by means of the cam action between the cam surfaces $21a_1$ and 25a under the load of the compression coil spring 27. Thus, the handle 24 is always positioned in the circumferential direction.

When it is intended to release the parking brake, the knob 32 is pulled rearwardly against the compression coil spring 33 to bring the key 31a of the release rod 31 into engagement with the axial key groove 21b of the sleeve member 21, and the handle 24 is turned about the axis of the metallic handle shaft 24b to apply its torque to the plunger 11 through the release rod 31, the key 31a, and the sleeve member 21. As a result, the plunger 11 is rotated by the torque of the handle 24 to disengage the pawl 17 from the ratchet teeth 11a of the plunger 11. Thus, the plunger 11 is returned forwardly by the returning effort applied thereto to release the parking brake. In this instance, the pin 15 of the plunger 11 is guided by the longitudinal edge of the longitudinal slot 14a to return the plunger 11 into the ratcheting position.

In FIG. 8 there is illustrated a modification of the hand brake lever assembly, wherein the release rod 31 and the knob 32 are replaced with a release rod 131 and a plate-like knob 132, respectively. The release rod 131 is integrally formed with a key 131a which is axially slidably coupled with the axial groove 25b in the cam member 25, while the plate-like knob 132 has a sleeve portion axially slidably coupled with the metallic handle shaft 24b and engaged with a rearward end of the release rod 131. Disposed between the plate-like knob 132 and the grip portion 24c of the handle 24 are a plurality of circumferentially equi-spaced coil springs 133 which are arranged to bias the release rod 131 forwardly for abutment with the retainer plate 28. The hand brake lever assembly of FIG. 8 may be further modified as shown in FIG. 9, wherein a single coil spring 133 is disposed between the cam member 25 and the retainer plate 28 to bias the release rod 131 forwardly.

Figure 10:
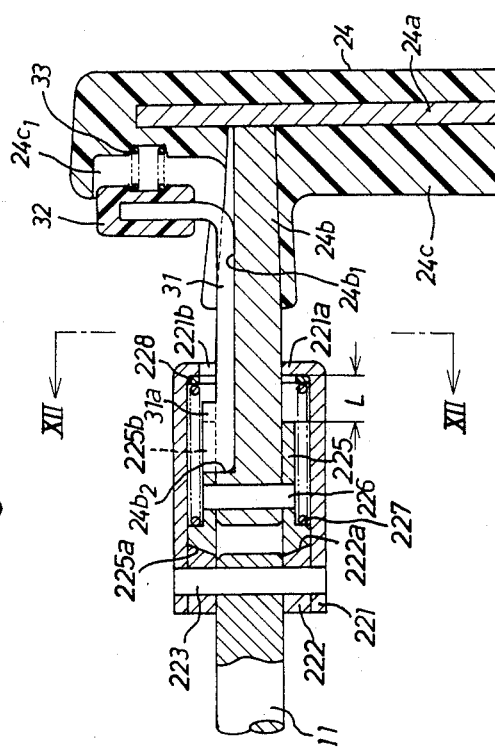
FIG. 10 illustrates another modification of the hand brake lever assembly shown in FIGS. 1 to 4.
Figure 11:
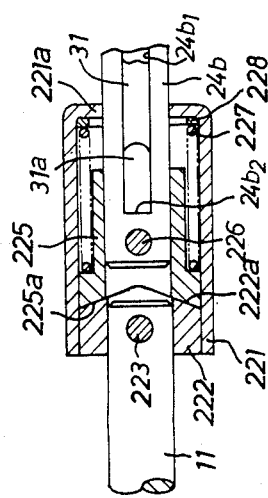
FIG. 11 is a sectional plan view of the modification shown in FIG. 10.

In FIGS. 10 to 12 there is illustrated another modification of the hand brake lever assembly, wherein the sleeve member 21, the collar 22, the cam member 25, the compression coil spring 27, and the retainer plate 28 are replaced with a sleeve member 221, a first cam member 222 in the form of a collar, a second cam member 225 in the form of an inner sleeve member, a compression coil spring 227, and an annular retainer 228, respectively. The sleeve member 221 is coaxially coupled with the rearward end of the plunger 11 through the first cam member 222 and is secured in place by means of a radial pin 223 for rotation with the plunger 11. The sleeve member 221 has an annular end wall 221a which is formed with an axial key groove 221b for engagement with the key 31a of the release rod 31. The first cam member 222 is formed with an annular cam surface 222a, while the second cam member 225 is formed at its forward end with an annular cam surface 225a complementary with the annular cam surface 222a of the first cam member 222. The second cam member 225 is fixed to the forward end of the metallic handle shaft 24b by means of a radial pin 226 and is axially slidably coupled within the sleeve member 221. The second cam member 225 is formed at its rearward end with an axial recess 225b in which the key 31a of the release rod 31 is axially slidably disposed for rotation with the second cam member 225. The key 31a of the release rod 31 is maintained in abutment with a forward end 24b₂ of the axial guide groove 24b₁ under the load of the compression coil spring 33. The compression coil spring 227 is engaged at its one end with an annular shoulder of the second cam member 225 and at its other end with the annular end wall 221a of the sleeve member 221 through the annular retainer 228 to bias the second cam member 225 forwardly so as to press the annular cam surface 225a into contact with the annular cam member surface 222a.

In operation, the handle 24 is pulled rearwardly to actuate the parking brake. In this operation, the force on the handle 24 is applied to the plunger 11 through the metallic handle shaft 24b, the radial pin 226, the second cam member 225, the compression coil spring 227, the sleeve member 221, and the radial pin 223 to cause rearward movement of the plunger 11. Thus, the cable 16 is pulled by the plunger 11 to actuate the parking brake, and the pawl 17 is engaged with any one of the ratchet teeth 11a of the plunger 11 to retain the plunger 11 in the pulled out position. In a condition where the plunger 11 has been pulled rearwardly by means of the handle 24 and retained in the pulled out position, the plunger 11 does not rotate even when the handle 24 is turned by being inadvertently touched by a part of the driver's body such as his knee. In this instance, the torque of the handle 24 is applied to the plunger 11 due to the frictional engagement between the annular cam surfaces 222a and 225a under the load of the compression coil spring 227. The torque of the handle 24 is, however, smaller than the torque required for disengaging the pawl 17 from the ratchet teeth 11a of the plunger 11. For this reason, the metallic handle shaft 24b and the parts assembled thereto are freely rotated without causing any rotation of the plunger 11. This is effective to retain the plunger 11 in the pulled out position so as to afford a safety factor against accidental release of the parking brake.

When it is intended to release the parking brake, the knob 32 is pulled rearwardly against the compression coil spring 33 to bring the key 31a of the release rod 31 into engagement with the axial key groove 221b of the sleeve member 221, and the metallic handle 24 is turned about the axis of handle shaft 24b to apply its torque to the plunger 11 through the release rod 31, key 31a, and the sleeve member 221. As a result, the plunger 11 is rotated by the torque of the handle 24 to disengage the pawl 17 from the ratchet teeth 11a of the plunger 11. Thus, the plunger 11 is returned forwardly by the returning effort applied thereto to release the parking brake. In this instance, the pin 15 of the plunger 11 is guided by the longitudinal edge of the longitudinal slot 14a to return the plunger 11 into the ratcheting position.

In FIG. 13 there is illustrated a further modification of the hand brake lever assembly, wherein a guard plate 34 is secured at one end thereof to the grip portion 24c of the handle 24. The guard plate 34 is coupled with a portion of the plunger 11 at the other end thereof to enclose the knob 32 of the release rod 31. The guard plate 34 is useful to avoid accidental release of the parking brake caused by inadvertent touch of the knob 32. The guard plate 34 may be assembled with the handle 24 as shown in FIG. 14, wherein the guard plate 34 is secured at one end thereof to the grip portion 24c of the handle 24 in the same manner as that in FIG. 13 and coupled with the sleeve member 21 at the other end thereof to enclose the knob 32 of the release rod 31.

In FIGS. 15 to 17 there is illustrated a still further modification of the hand brake lever assembly, wherein a guard plate 34 is assembled with the handle 24 to enclose the knob 32 of the release rod 31. The guard plate 34 has a fork portion 34a coupled with the metallic handle shaft 24b and secured to the same by means of a radial pin 35 and a rear end 34b coupled within a recess 24c₂ in the grip portion 24c of the handle 24.

The guard plate 34 may be assembled with the handle 24 as shown in FIGS. 18 and 19, wherein the guard plate 34 has a semi-cylindrical portion 34c coupled with the sleeve member 21 and a rear end 34d secured to the grip portion 24c of the handle 24 by a screw 36.

Furthermore, the hand brake lever assembly may be modified as shown in FIGS. 20 and 21, wherein the grip portion 24c of the handle 24 is integrally formed with a trigger guard 37 which is arranged to enclose the knob 32 of the release rod 31.

While there have been described what are at present considered to be preferred embodiments of the invention, it will be understood that various other modifications may be made therein, and it is intended that the appended claims cover all such modifications as fall within the true spirit and scope of the invention.

What is claimed is:

1. A hand brake lever assembly for a parking brake, said hand brake lever assembly comprising:
  (a) a longitudinal plunger mounted in a support member for axial slidable movement and for rotation about its axis and having a first end and a second end;
  (b) a locking mechanism associated with said plunger to retain said plunger in a pulled out position against a returning effort of the parking brake acting thereon and being arranged to be released by rotation of said plunger;
  (c) a sleeve member coaxially secured to the second end of said plunger for rotation therewith, said sleeve member having an annular end wall formed with an annular cam surface and an axial key groove;
  (d) a handle having a shaft extending therefrom and inserted into said sleeve member for axial movement and rotation about its axis, said handle shaft having formed thereon an axial guide groove and being integrally provided with a cam member which is formed with an annular cam surface complementary with the annular cam surface of said sleeve member, said handle shaft being contained within said sleeve member for axial movement and rotation about its axis;
  (e) first resilient means for pressing the annular cam surface of said same member into contact with the annular cam surface of said sleeve member to retain said handle in a predetermined annular position in relation to said plunger;
  (f) a release rod axially slidably coupled with the axial guide groove of said handle shaft for rotation with said handle, said release rod being integrally formed at one end thereof with a key which is axially slidably coupled with an axial groove in said cam member to be brought into engagement with the axial key groove of said sleeve member, said release rod being further provided at the other end thereof with a knob which is arranged adjacent a grip portion of said handle; and (g) second resilient means for biasing the knob of said release rod toward said plunger to disengage the key of said release rod from the axial key groove of said sleeve member.

2. A hand brake lever assembly as claimed in claim 1, wherein said knob is integrally connected with the other end of said release rod.

3. A hand brake lever assembly as claimed in claim 1, wherein said knob is in the form of a plate-like knob having a sleeve portion axially slidably coupled with said handle shaft and engaged with the other end of said release rod.

4. A hand brake lever assembly as claimed in claim 1, wherein said second resilient means is a compression spring disposed between said knob and the grip portion of said handle.

5. A hand brake lever assembly as claimed in claim 1, wherein said second resilient means is a compression spring engaged at one end thereof with said cam member and at the other end thereof with said release rod.

6. A hand brake lever assembly as claimed in claim 1, wherein a guard plate is assembled with the grip portion of said handle to enclose said knob.

7. A hand brake lever assembly as claimed in claim 6, wherein said guard plate is secured at one end thereof to the grip portion of said handle and coupled at the other end thereof with a portion of said plunger to enclose said knob.

8. A hand brake lever assembly as claimed in claim 6, wherein said guard plate is secured to one end thereof to the grip portion of said handle and coupled at the other end thereof with said sleeve member to enclose said knob.

9. A hand brake lever assembly as claimed in claim 6, wherein said guard plate is secured at one end thereof to the grip portion of said handle and coupled at the other end thereof with a portion of said handle shaft to enclose said knob.

10. A hand brake lever assembly as claimed in claim 1, wherein the grip portion of said handle is integrally formed with a trigger guard which is arranged to enclose said knob.

11. A hand brake lever assembly as claimed in claim 1 and further comprising a cable connected to said plunger.

* * * * *

UNITED STATES PATENT AND TRADEMARK OFFICE
CERTIFICATE OF CORRECTION

PATENT NO. : 4,805,480

DATED : FEBRUARY 21, 1989

INVENTOR(S) : Kaoru TSUBOUCHI et al

It is certified that error appears in the above-identified patent and that said Letters Patent is hereby corrected as shown below:

Claim 1, line 25, delete "handle shaft" and insert therefor --cam member--.

Claim 1, line 29, delete "same" and insert therefor --cam--.

Claim 1, line 31, delete "annular" and insert therefor --angular--.

Signed and Sealed this

Twentieth Day of February, 1990

*Attest:*

JEFFREY M. SAMUELS

*Attesting Officer*  *Acting Commissioner of Patents and Trademarks*